US006733026B1

(12) United States Patent
Robberson et al.

(10) Patent No.: US 6,733,026 B1
(45) Date of Patent: May 11, 2004

(54) FOLDING CART

(76) Inventors: Beverly J Robberson, 2012 NM 89, Melrose, NM (US) 88154; James D. Robberson, 2012 NM 89, Melrose, NM (US) 88154

( * ) Notice: Subject to any disclaimer, the term of this patent is extended or adjusted under 35 U.S.C. 154(b) by 0 days.

(21) Appl. No.: 10/455,708

(22) Filed: Jun. 5, 2003

(51) Int. Cl.$^7$ ................................. B62B 3/02
(52) U.S. Cl. ..................... 280/415.1; 280/651; 280/30; 280/47.371
(58) Field of Search ............................. 280/415.1, 30, 280/47.371, 47.34, 656, 651, 655.1

(56) References Cited

U.S. PATENT DOCUMENTS

| | | | | |
|---|---|---|---|---|
| 166,903 | A | * 8/1875 | Staub | 280/39 |
| 4,300,783 | A | * 11/1981 | Fisher | 280/87.021 |
| 4,796,909 | A | * 1/1989 | Kirkendall | 280/651 |
| 5,306,029 | A | * 4/1994 | Kaiser, II | 280/30 |
| 5,772,222 | A | * 6/1998 | Sim et al. | 280/30 |

FOREIGN PATENT DOCUMENTS

| EP | 0262592 | * 4/1988 | B62B/3/10 |
|---|---|---|---|
| JP | 6--189860 | * 7/1994 | A47J/39/02 |

* cited by examiner

Primary Examiner—Avraham Lerner
(74) Attorney, Agent, or Firm—Aaron R. Clements; Hurley, Reyes & Guinn

(57) ABSTRACT

A folding cart is disclosed which has a forward section, a main section, and a rear section, along with forward and rear end rails and left and right side rails. The forward and rear portions of the left and right side rails fold to a coplanar position with the main portion of each respective side rail, while the forward and rear end rails fold down to a position coplanar with the forward section and rear section, respectively. The forward and rear sections may then be rotated to a position over the main section. The forward and rear sections each have mounted to their bottom surfaces a dual wheel assembly, each dual wheel assembly having a pair of wheels which may be folded to a position parallel to their respective forward or rear section. The forward dual wheel assembly is mounted to the front section of the folding cart a rotating pivot, while the rear dual wheel assembly is mounted directly to the rear section. Finally, a folding handle is provided which is attached to the forward dual wheel assembly. The handle, when folded, extends from the midpoint of the forward dual wheel assembly over the folded wheels to the rear of the folded cart and clasps to the rear of the folded cart.

4 Claims, 4 Drawing Sheets

FOLDING CART

CROSS REFERENCE TO RELATED APPLICATIONS

Not Applicable.

STATEMENT REGARDING FEDERALLY SPONSORED RESEARCH

Not Applicable.

REFERENCE TO "MICROFICHE APPENDIX"

Not Applicable.

BACKGROUND OF THE INVENTION

This Invention relates to a folding utility cart for general use that folds into a compact shape for ease of transportation and storage. Conventional carts are made from a variety of materials, including metal, wood, and plastic, and typically have a flat bed with raised sides. Wheels are typically mounted to the underside of the bed by means of brackets, with the front wheels customarily connected to a forward extending handle and mounted for steerability. While these carts are generally sturdy and can stand up to heavy use for extended periods of time, they are large and generally difficult to transport in vehicles, particularly modern vehicles with relatively small trunks. The overall volume occupied by traditional carts can render them difficult and space consuming to store.

Various hand trucks, carts, wagons, creepers, and the like have been hinged in order to allow them to be folded for storage. See, e.g., Martin, U.S. Pat. No. 6,095,532; Crowell, U.S. Pat. No. 5,857,695; Miles, et al., U.S. Pat. No. 5,611,552; DeWijn, U.S. Pat. 4,398,736; Olsson, U.S. Pat. No. 3,985,372; and Hoff, U.S. Pat. No. 3,822,069. While the methods divulged in these patents have been somewhat effective for flat carts, their arrangements are not fully successful with respect to carts having side rails, and none of them are directed to such a cart. Greenberg, U.S. Pat. No. 4,957,306 discusses a two-wheeled lawn cart with sides that fold down over the bed, but the method of folding discussed in the '306 patent is only partially successful in creating a compact structure; the cart discussed in the '306 patent is also substantially different than the present Invention. A folding child's wagon with removable rails and wheels with a bed that folds in half is described by Shorter, U.S. Pat. No. 5,957,482. However, the folding mechanism is for the bed only, with a user forced to partially disassemble the wagon by removing the side rails and wheels in order to attain a fully compact structure. None of this prior work fully addresses the need for a fully collapsible cart, with all side and end rails as well as wheels folding into a compact package. Thus, there is a continuing need for an improved cart with side and end rails which is sturdy and which is foldable as a complete unit into a compact package for efficient storage. The present Invention answers those needs.

SUMMARY OF THE INVENTION

In accordance with the present Invention, a folding cart having both an operative position for use as well as a folded position for storage is described. The cart includes four major sets of components: the frame, which also forms the bed; the side and end rails; the wheel assemblies; and the handle, which also serves to lock the cart in its folded position. The frame is divided into forward, middle (or main), and rear frame sections. The forward and rear frame sections are defined generally as a planar structure defined by and comprising forward, rear, left, and right members with zero or more reinforcing members and a floor member attached to the upper side of the frame section. The forward and rear members of the forward and rear frame sections should be substantially parallel to each other, but do not need to be of equal lengths, such that the structure defined may be non-rectangular. The middle frame section, however, is defined generally as a planar, rectangular structure defined by and comprising forward, rear left, and right members with zero or more reinforcing members and a floor member attached to the upper side of the frame section. The reinforcing members extend across the shape defined by the forward, rear, left, and right members and are attached at their ends to any two of those members. The rear edge of the forward frame section is rotatably connected to the forward edge of the middle frame section, and the forward edge of the rear frame section is rotatably connected to the rear edge of the middle frame section. By this arrangement, in the folded position, the forward and rear frame sections fold to the top surface of the middle frame section. In the unfolded, operative position, the forward, middle, and rear frame sections form a plane. The left and right members of each frame section are hollow, forming a tube down each side of each frame section. Furthermore, manually articulable spring-loaded locking pins are present at each end of both the left and right members of the middle frame section. Each locking pin may be manually retracted and locked back into its respective frame member end, and when released, each locking pin extends from the end of its respective frame member end. In the unfolded position, the locking pins are released and extend into the respective contiguous left or right side member of the forward or rear frame section, thereby providing stability and great mechanical strength to the unfolded frame.

The side and end rails are also foldable. The forward end rail is rotatably connected at its lower edge to the forward edge of the forward frame section such that it folds from a raised position perpendicular to the frame into a position coplanar with the frame. Similarly, the rear end rail is rotatably connected at its lower edge to the rear edge of the rear frame section such that it too folds from a raised position perpendicular to the frame into a position coplanar with the frame. In a departure from customary practice, the left and right side rails do not fold into a position coplanar with the frame sections; rather, each side rail is divided into three sections; a forward side rail, middle side rail, and rear side rail. The rear edge of the forward side rail is rotatably connected to the forward edge of the middle side rail, and the forward edge of the rear side rail is rotatably connected to the rear edge of the middle side rail. The lower edge of the left middle side rail is non-rotatably connected to the left edge of the middle frame section such that the plane defined by the left middle side rail is substantially perpendicular to the plane defined by the middle frame section. The lower edge of the right middle side rail is non-rotatably connected in the same fashion to the right edge of the middle frame section. By this arrangement, the forward and rear side rails on each side may rotate from a position along the corresponding side edge of the corresponding forward or rear frame section into a position along the corresponding edge of the middle frame section and flush with the corresponding middle side rail.

The present Invention also includes two dual wheel assemblies, a forward dual wheel assembly and a rear dual wheel assembly. Each dual wheel assembly is substantially identical to the other, but the methods differ for attaching each wheel assembly to the lower surface of the frame. The rear dual wheel assembly is connected to the lower surface of the rear frame section in a fixed position; the forward dual wheel assembly, however, is rotatably connected to the lower surface of the forward frame section. This arrangement allows the forward dual wheel assembly to be used to steer the cart. Each dual wheel assembly includes a pair of wheels, each rotatably connected to a wheel bracket via a wheel axle. Each wheel bracket is rotatably connected by a pivot to one end of a dual wheel assembly bracket, which is connected to the lower frame as described. The dual wheel assembly bracket includes two wheel bracket locking pins, with one locking pin corresponding to each of the wheel brackets. By use of the locking pins, the wheels can be locked in two or more positions, including the fully folded and fully unfolded positions.

Finally, the present Invention includes a handle by which a user may pull the cart, which also serves to lock the Invention into the folded position. The handle is attached at one end to the forward dual wheel assembly's dual wheel assembly bracket. The manner of attachment is such that the handle is rotatable in the vertical plane, but not in the horizontal plane. The handle is divided into three segments, including a handgrip, a middle segment, and an attachment segment, with the attachment segment actually attached to the forward dual wheel assembly. The attachment segment is rotatably connected to the middle segment; both the attachment segment and middle segment comprise tubes of identical cross-section. Furthermore, a locking mechanism is set in the middle segment such that when the attachment segment and middle segment are rotated into a linear, coaxial position, the two segments are locked into this position. The locking mechanism has a manual control allowing the user to release this lock when the Invention is being folded. The handgrip is attached coaxially to the middle segment and is of smaller cross-sectional dimension than the middle segment, such that the attachment end of the handgrip extends inside the middle segment. The handgrip may slide within the middle segment, and is retained in the middle segment by means of a spring such that a user may slide the handgrip out a short distance, but may not remove the handgrip from the middle segment. This ability to slide the handgrip out a short distance is important because it allows the user to latch the handgrip around the Invention in the folded position. After passing from the middle segment, the handgrip bends to a position substantially perpendicular to the line formed by the central axis of the middle segment. The bent portion of the handgrip is of a suitable size for a person to pull on it with one hand. The terminal end of the handgrip is attached to a lip plate, which, in the folded position, holds the handgrip in place around the rear end of the folded Invention.

DETAILED DESCRIPTION OF THE INVENTION

Figure 1:
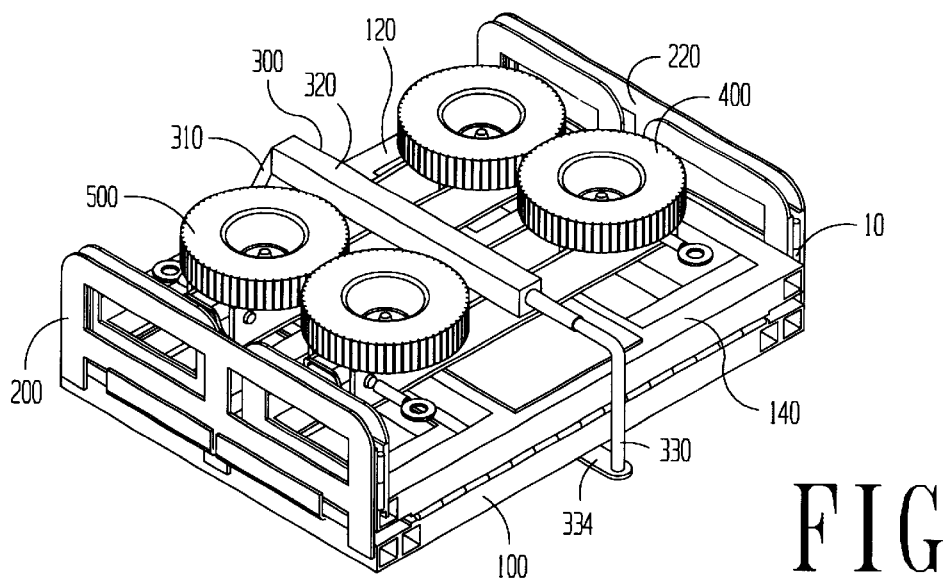
FIG. 1 is a perspective view of the cart in its fully folded position.
Figure 2:
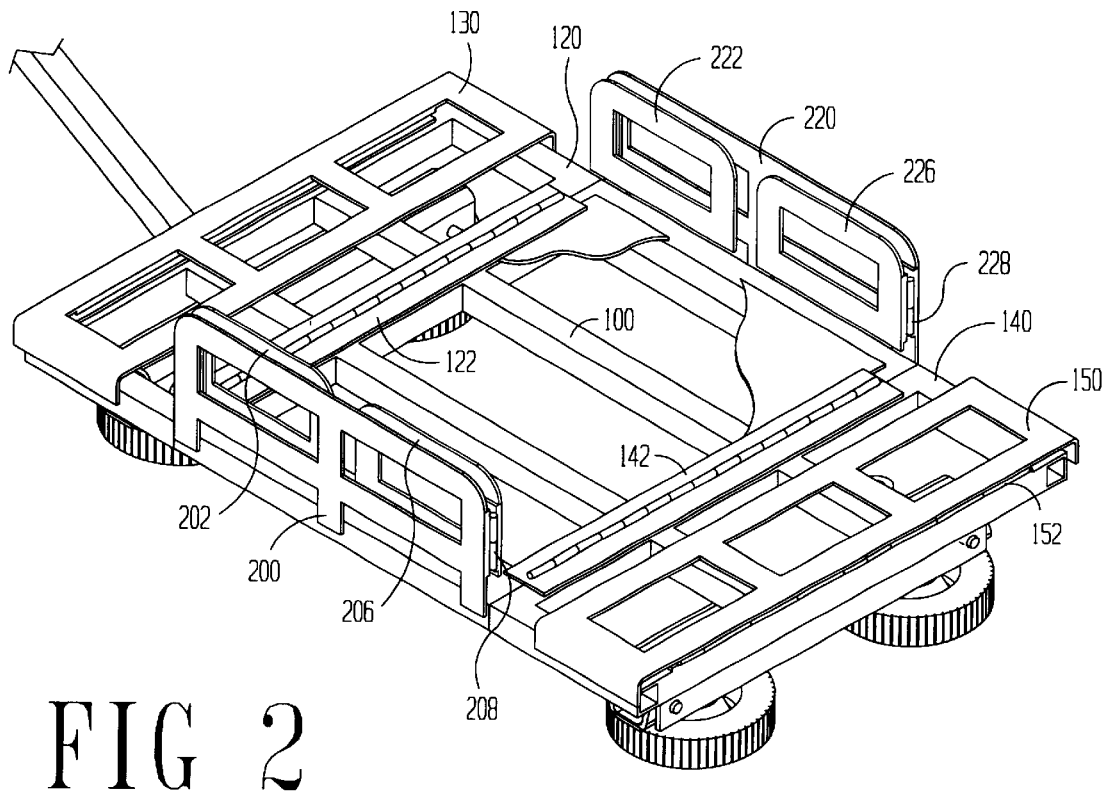
FIG. 2 is a perspective view of the partially unfolded cart.
Figure 3:
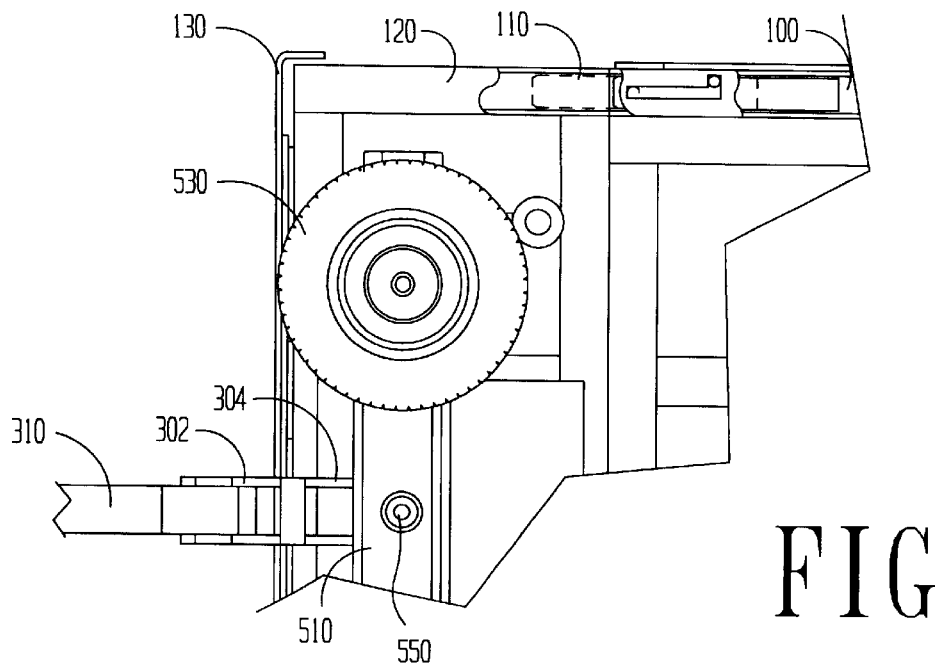
FIG. 3 is a partial view from a bottom perspective of the orientation of the folded wheel, handle, and front wheel assembly swivel.
Figure 4:
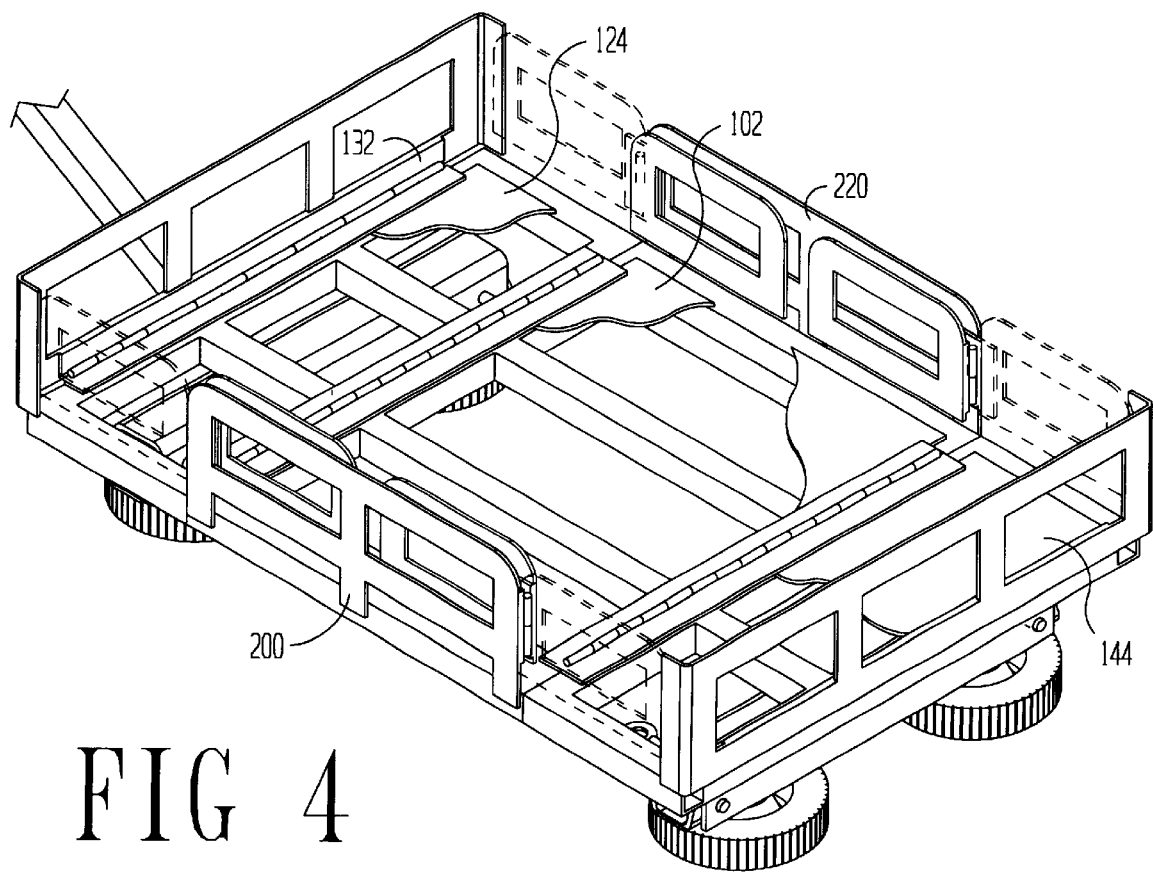
FIG. 4 is a perspective view of the partially unfolded cart demonstrating the manner in which the side panels unfold.
Figure 5:
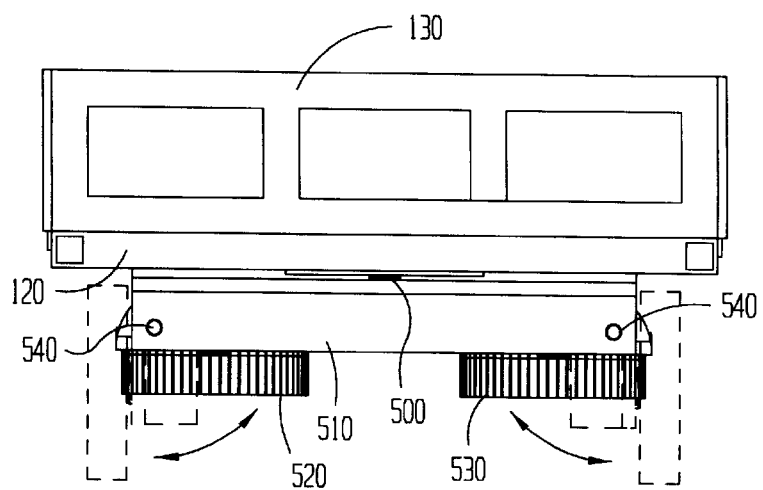
FIG. 5 is a view of the cart from the rear demonstrating the manner in which the wheels unfold.
Figure 6:
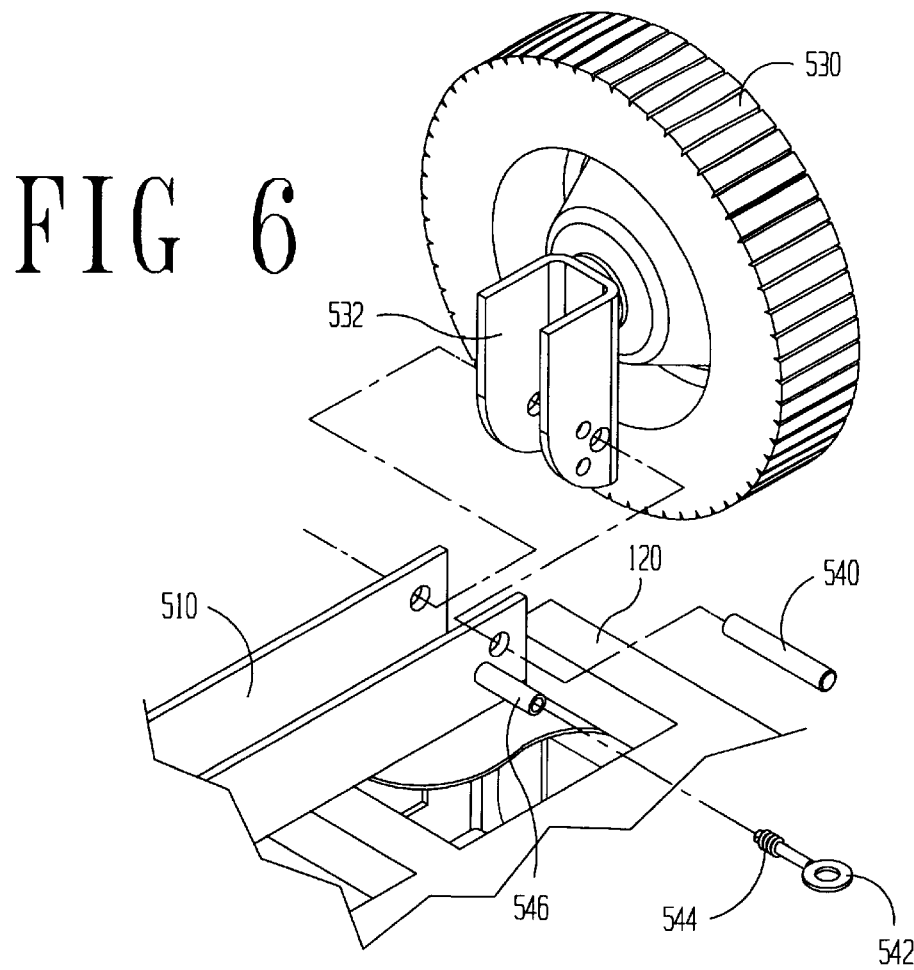
FIG. 6 is an exploded view of one end of the dual wheel assembly.
Figure 7:
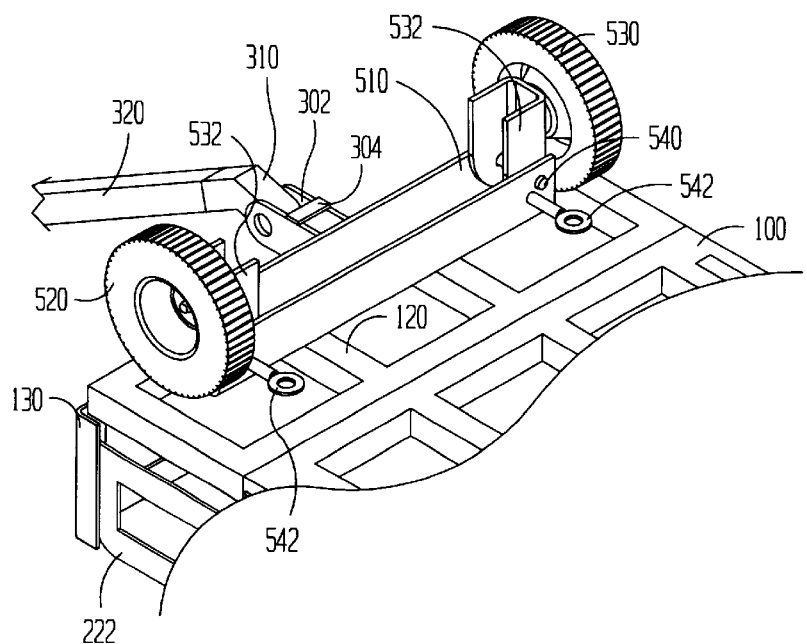
FIG. 7 is a partial view of the bottom of the front end of the cart showing the front dual wheel assembly.

FIGS. 1, 2, 4, and 8 disclose the folding cart of the present Invention in a variety of positions from the fully folded position to the fully operative position. In these figures can be seen the main bed frame 100, forward bed frame 120 and the rear bed frame 140 which, together, form the frame for the overall frame of the Invention. As shown in FIG. 2, the forward bed frame 120 and rear bed frame 140 are rotatably attached to the forward and rear edges, respectively, of the main bed frame 100 by a forward bed frame hinge 122 and a rear bed frame hinge 142, respectively. On the top surface of the forward bed frame 120, main bed frame 100, and rear bed frame 140 are attached the forward bed floor 124, main bed floor 102, and rear bed floor 144, respectively. In the preferred embodiment of the Invention, the perimeters of the forward bed frame 120, main bed frame 100, and rear bed frame 140 are formed from pieces of tubing. Set within each of the tubes forming the left and right sides of the main bed frame 100 are a pair of locking pins 110, not shown in the drawings but each of which will be understood by those in the art as a solid pin which extends from the end of the tubing forming the left or right side of the main bed frame 100 due to tension provided by a spring. Those in the art will further understand that these spring-loaded locking pins 110 may be manually retracted entirely within the tubing. When the apparatus is unfolded and the locking pins 110 are in the unretracted position, it will be understood that each locking pin extends from the end of its respective side tube of the main bed frame 100 into the contiguous side tube of either the forward bed frame 120 or rear bed frame 140. Those in the art will appreciate the methods and materials used to manufacture the forward bed frame 120, main bed frame 100, and rear bed frame 140, and will furthermore appreciate that the forward bed floor 124, main bed floor 102, and rear bed floor 144 may be made out of a variety of solid or non-solid (mesh or other similar) sheet materials, such as, but not limited to, sheet steel or steel mesh or grille type materials.

Attached non-rotatably to the left side of the main bed frame 100 is a left side rail 200. Similarly, a right side rail 220 is attached non-rotatably to the right side of the main bed frame 100. At the forward edge of the left side rail, the left forward side rail 202 is rotatably attached by means of a left forward side rail hinge 204. Also, at the rear edge of the left side rail, the left rear side rail 206 is attached to the left side rail by the left rear side rail hinge 208. The right forward side rail 222 and right rear side rail 226 are similarly rotatably attached to the forward edge and rear edge, respectively, of the right side rail 220 by means of the right forward side rail hinge 224 and right rear side rail hinge 228, respectively. Additionally, there is a forward end rail 130 attached to the forward edge of the forward bed frame 120 by means of a forward end rail hinge 132 and a rear end rail 150 attached to the rear edge of the rear bed frame 140 by means of a forward end hinge 152.

Figure 8:
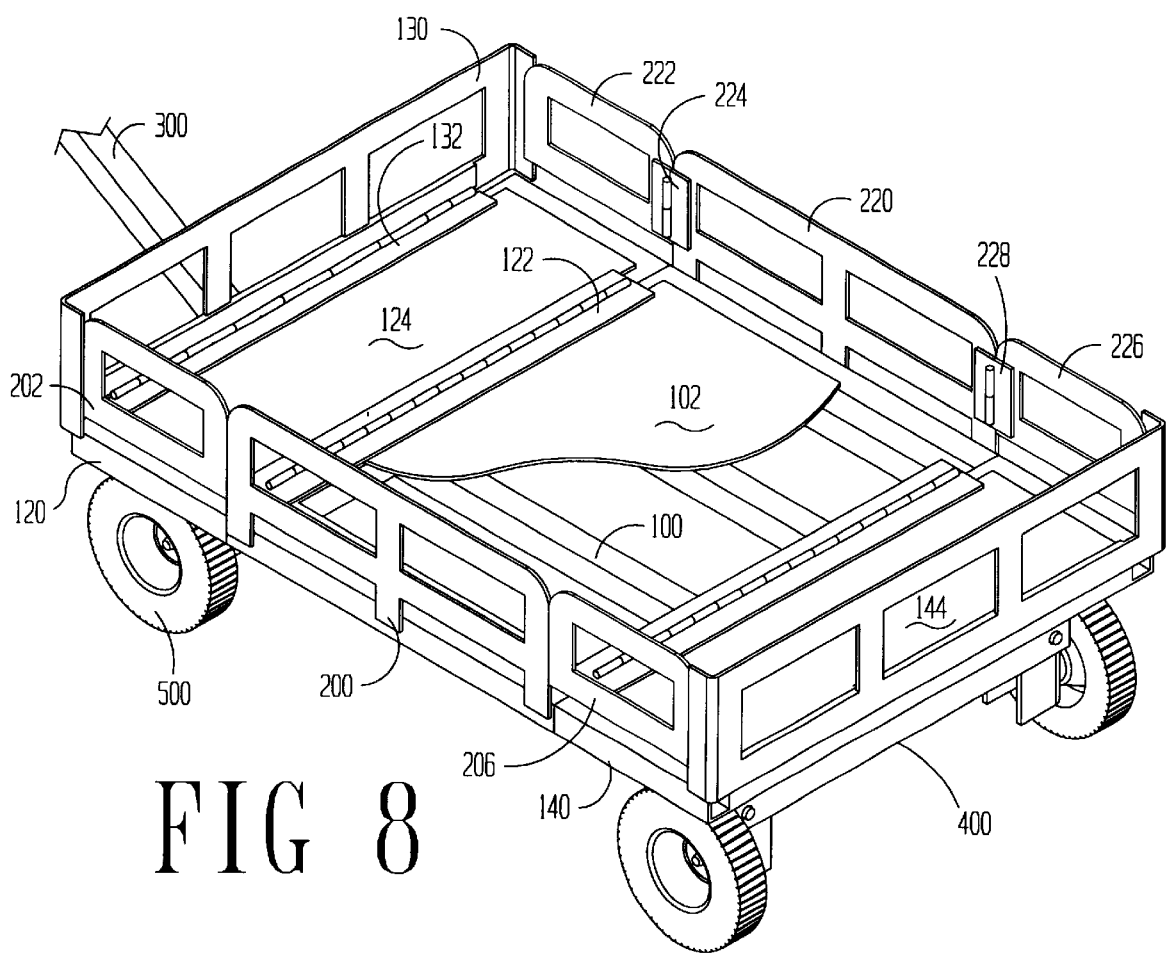
FIG. 8 is a perspective view of the fully unfolded cart.

As seen in FIG. 2, the left forward side rail 202, left rear side rail 206, right forward side rail 222, and right rear side rail 226 all rotate towards the center of the Invention in its folded state and come to rest flush with the left side rail 200 and right side rail 220. Furthermore, the combined length of the left forward side rail 202 and left rear side rail 206 is shorter than the length of the left side rail 200, and a similar arrangement exists for the right side components. It will be observed, as in FIG. 2, that the forward end rail 130 and rear end rail 150 are planar surfaces but for a small curved portion at each end. Referring to FIG. 8, when any of the rotatable forward or rear side rails 202, 206, 222, 226 are moved into their unfolded positions, a slight overlap occurs with this small curved portion at the corresponding end of the forward end rail 130 or rear end rail 150, thereby forming a full side rail around the entire perimeter of the Invention.

As seen in FIGS. 1, 3, 5, 6, and 7, a forward dual wheel assembly 500 is rotatably attached to the lower side of the forward bed frame 120, and a rear dual wheel assembly 400 is non-rotatably attached to the lower side of the rear bed frame 150. Each of these dual wheel assemblies are identical but for their method of attachment to the apparatus. The forward dual wheel assembly 500 includes a forward dual wheel assembly bracket 510, which comprises an elongate U-shaped channel, with the open side of the forward dual wheel assembly bracket 510 oriented downward. The upper surface of the forward dual wheel assembly bracket 510 is attached to the forward dual wheel assembly pivot 550, which is also attached to the forward bed frame 120. Referring particularly to FIGS. 3, 5, 6, and 7, the forward dual wheel assembly 500 comprises the forward dual wheel assembly bracket 510 as well as a number of other components. At the ends of the forward dual wheel assembly bracket 510 are a left forward wheel bracket 522 and a right wheel forward bracket 532. Each of these forward wheel brackets is a short U-shaped bracket which has a curved end and a squared end. Each of these forward wheel brackets is connected at its curved end to the forward dual wheel assembly bracket 510 by means of a wheel bracket pivot 540, which passes through the forward and rear surfaces of both the forward dual wheel assembly bracket 510 and the corresponding forward wheel bracket, with the open end of the wheel bracket oriented inwards towards the centerline of the Invention. A left forward wheel 520 is mounted to the outer surface of the left forward wheel bracket 522, and a right forward wheel 530 is mounted to the outer surface of the right forward wheel bracket 532. Additionally, at each end of the forward dual wheel assembly bracket 510, a forward wheel bracket locking pin 542 is mounted to each end of the rear surface of the forward dual wheel assembly bracket 510 at a distance from the corresponding forward wheel bracket pivot 540 wherein said distance is less than the radius of curvature of the curved end of either the left forward wheel bracket 522 or right forward wheel bracket 532. Each of the forward wheel bracket locking pins 542 are mounted to the forward dual wheel assembly bracket 510 by a forward wheel bracket locking pin sleeve 546, which includes a forward wheel bracket locking pin spring 544, which is not pictured, but which will be understood by those familiar with the art. In its rest position, the forward wheel bracket locking pin spring 544 pulls the corresponding forward wheel bracket locking pins 542 down into the forward wheel bracket locking pin sleeve 546 such that the end of the forward wheel bracket locking pin 542 extends through the forward dual wheel assembly bracket 510. Each of the left forward wheel bracket 522 and right forward wheel bracket 532 has two holes through its upper surface at a distance from the forward wheel bracket pivot 540 equal to the distance between the forward wheel bracket pivot 540 and the corresponding forward wheel bracket locking pin 542. By this orientation, as seen particularly in FIG. 5, the corresponding forward wheel bracket locking pin 542 may pass through the holes on either the left forward wheel bracket 522 and the right forward wheel bracket 532. The holes are oriented such that when a forward wheel bracket locking pin 542 extends through its corresponding wheel bracket, the wheel is locked either in the folded position or the unfolded position. Those with ordinary skill in the art will understand the method of mounting the forward wheel bracket locking pin 542, forward wheel bracket locking pin spring 544, and forward wheel bracket locking pin spring 546 and the placement of the holes in the left forward wheel bracket 522 and right forward wheel bracket 532 in order to effectuate this operation.

Similarly, the rear dual wheel assembly 400 includes a rear dual wheel assembly bracket 410, which comprises an elongate U-shaped channel, with the open side of the rear dual wheel assembly bracket 410 oriented downward. The upper surface of the rear dual wheel assembly bracket 410 is attached directly to the lower surface of the rear bed frame 140. Referring particularly to FIGS. 3, 5, 6, and 7, the rear dual wheel assembly 400 comprises the rear dual wheel assembly bracket 410 as well as a number of other components. At the ends of the rear dual wheel assembly bracket 410 are a left rear wheel bracket 422 and a right wheel rear bracket 432. Each of these rear wheel brackets is a short U-shaped bracket which has a curved end and a squared end. Each of these rear wheel brackets is connected at its curved end to the rear dual wheel assembly bracket 410 by means of a wheel bracket pivot 440, which passes through the rear and rear surfaces of both the rear dual wheel assembly bracket 410 and the corresponding rear wheel bracket, with the open end of the wheel bracket oriented inwards towards the centerline of the Invention. A left rear wheel 420 is mounted to the outer surface of the left rear wheel bracket 422, and a right rear wheel 430 is mounted to the outer surface of the right rear wheel bracket 432. Additionally, at each end of the rear dual wheel assembly bracket 410, a rear wheel bracket locking pin 442 is mounted to each end of the rear surface of the rear dual wheel assembly bracket 410 at a distance from the corresponding rear wheel bracket pivot 440 wherein said distance is less than the radius of curvature of the curved end of either the left rear wheel bracket 422 or right rear wheel bracket 432. Each of the rear wheel bracket locking pins 442 are mounted to the rear dual wheel assembly bracket 410 by a rear wheel bracket locking pin sleeve 446, which includes a rear wheel bracket locking pin spring 444, which is not pictured, but which will be understood by those familiar with the art. In its rest position, the rear wheel bracket locking pin spring 444 pulls the corresponding rear wheel bracket locking pins 442 down into the rear wheel bracket locking pin sleeve 446 such that the end of the rear wheel bracket locking pin 442 extends through the rear dual wheel assembly bracket 410. Each of the left rear wheel bracket 422 and right rear wheel bracket 432 has two holes through its upper surface at a distance from the rear wheel bracket pivot 440 equal to the distance between the rear wheel bracket pivot 440 and the corresponding rear wheel bracket locking pin 442. By this orientation, as seen particularly in FIG. 5, the corresponding rear wheel bracket locking pin 442 may pass through the holes on either the left rear wheel bracket 422 and the right rear wheel bracket 432. The holes are oriented such that when a rear wheel bracket locking pin 442 extends through its corresponding wheel bracket, the wheel is locked either in the folded position or the unfolded position. Those with ordinary skill in the art will understand the method of mounting the rear wheel bracket locking pin 442, rear wheel bracket locking pin spring 444, and rear wheel bracket locking pin spring 446 and the placement of the holes in the left rear wheel bracket 422 and right rear wheel bracket 432 in order to effectuate this operation.

Finally, the handle 300 of the folding cart of the present invention comprises a number of components and is connected to the forward midpoint of the forward dual wheel assembly 500 by means of a handle mount 304, which extends forward from the forward dual wheel assembly 500 and is rotatively connected to the curved main handle bar 310 by means of a handle hinge 302. The handle hinge 302 rotates only in the vertical plane and does not rotate in any horizontal plane. This allows the user to rotate the forward dual wheel assembly 500 around the forward dual wheel assembly pivot 550 by applying lateral torque to the handle 300. The curved main handle bar 310 is a short piece of tubing formed into a curve of an overall length substantially equal to the distance from the handle hinge 302 to the bottom of the wheels 420, 430, 520, 530 when they are in their retracted, locked, positions. The curve in the curved main handle bar 310 allows the handle to curve upwards from the handle hinge 302 around the forward end of the forward bed frame 120. Attached rotatively to the curved main handle bar 310 is the straight main handle bar 320. The straight main handle bar 320 forms the main shaft of the handle 300 and can be of any desired length suitable for providing a convenient cart handle to a user. The straight main handle bar 320 is formed from a tube with a cross-section similar to that of the curved main handle bar 310. The rotation point for the connection between the straight main handle bar 320 and curved main handle bar 310 is provided by a main handle hinge 326. Housed within the straight main handle bar 320 at the end connected to the curved main handle bar 310 is a main handle bar locking pin 322, which extends from the end of the straight main handle bar 320 into the contiguous end of the curved main handle bar 310 when in the unfolded position. The main handle bar locking pin 322 is kept in the extended position by means of a main handle bar locking pin spring 324, and may be manually retracted into the straight main handle bar 320 in order to allow rotation of the main handle hinge 326. While these structures are not depicted in the drawings, their design and method of manufacture will be understood by those in the art. From the end of the straight handle bar 320 opposite the curved handle bar 310 extends a handle and locking clasp 330 formed from a solid piece of cross-sectional dimension equal to or smaller than the inner cross-sectional dimension of the straight handle bar 320. One end of the handle and locking clasp extends within the tubing forming the straight handle bar 320 and is attached to a handle and locking clasp spring 332. The handle and locking clasp spring 332 keeps the respective end of the handle and locking clasp retracted within the straight handle bar 320, but manual force provided by a user may cause the handle to partially slide out from the straight handle bar 320. The other end of the handle and locking clasp is curved to provide a user with a handle end, and is terminated by the locking clasp 334.

While the Invention may be formed from any suitably strong material, it is understood that the preferred material is steel. Those familiar with the art will understand the components of the invention, their methods of manufacture, and the methods of connecting them to form the complete Invention. While the preferred embodiment has been described, it will furthermore be understood that various changes can be made therein without departing from the spirit and scope of the invention.

Catalogue of Elements

10 Folded cart
20 Unfolded cart
100 Main bed frame
102 Main bed floor
110 Main bed frame locking pin
120 Forward bed frame
122 Forward bed frame hinge
124 Forward bed floor
130 Forward end rail
132 Forward end rail hinge
140 Rear bed frame
142 Rear bed frame hinge
144 Rear bed floor
150 Rear end rail
152 Rear end rail hinge
200 Left side rail
202 Left forward side rail
204 Left forward side rail hinge
206 Left rear side rail
208 Left rear side rail hinge
220 Right side rail
222 Right forward side rail
224 Right forward side rail hinge
226 Left rear side rail
228 Left rear side rail hinge
300 Handle
302 Handle hinge
304 Handle mount
310 Curved main handle bar
320 Straight main handle bar
322 Main handle bar locking pin
324 Main handle bar locking pin spring
326 Main handle hinge
330 Handle and locking clasp
332 Handle and locking clasp spring
334 Locking clasp
400 Rear dual wheel assembly
410 Rear dual wheel assembly bracket
420 Left rear wheel
422 Left rear wheel bracket
430 Right rear wheel
432 Right rear wheel bracket
440 Rear wheel bracket pivot
442 Rear wheel bracket locking pin
444 Rear wheel bracket locking pin spring
446 Rear wheel bracket locking pin sleeve
500 Forward dual wheel assembly
510 Forward dual wheel assembly bracket
520 Left forward wheel
522 Left forward wheel bracket
530 Right forward wheel
532 Right forward wheel bracket
540 Forward wheel bracket pivot
542 Forward wheel bracket locking pin
544 Forward wheel bracket locking pin spring
546 Forward wheel bracket locking pin sleeve
550 Forward dual wheel assembly pivot

The invention claimed is:

1. A folding cart comprising:
   a. a forward bed frame further comprising a left member, a right member, a forward member, a rear member, and a forward bed floor;
   b. a middle bed frame further comprising a left member, a right member, a forward member, a rear member, and a main bed floor;
   c. a rear bed frame further comprising a left member, a right member, a forward member, a rear member, and a rear bed floor;
   d. a forward dual wheel assembly attached to the bottom of said forward bed frame by means for pivoting said forward dual wheel assembly with respect to said forward bed frame, further comprising a left wheel and a right wheel, with each of said wheels being rotatably connected at its transverse axle to said means for pivoting said forward dual wheel assembly by means for folding said wheels from a position substantially parallel with said lower frame to a position perpendicular to the plane of said lower frame;

e. a rear dual wheel assembly attached to the bottom of said rear bed frame, further comprising a dual wheel assembly further comprising a left wheel and a right wheel, with each of said wheels being rotatably connected at its transverse axle to said rear bed frame by means for folding said wheels from a position substantially parallel with said lower frame to a position perpendicular to the plane of said lower frame; and f. a folding handle attached to the forward surface of said forward dual wheel assembly;

wherein said rear member of said forward bed frame is rotatively attached to said forward member of said main bed frame by hinge means and wherein said forward member of said rear bed frame is rotatively attached to said rear member of said main bed frame by hinge means.

2. The folding cart of claim 1 further comprising:

a. a forward end rail comprising a substantially planar member of substantially equal width as the width of said forward bed frame and rotatively connected along its lower edge to said forward member of said forward bed frame by hinge means;

b. a rear end rail comprising a substantially planar member of substantially equal width as the width of said rear bed frame and rotatively connected along its lower edge to said rear member of said rear bed frame by hinge means;

c. a left side rail comprising a substantially planar member of substantially equal width as said left member of said middle bed frame and non-rotatively connected along its lower edge to said left member of said middle bed frame such that said left side rail is substantially perpendicular to said middle bed frame;

d. a right side rail comprising a substantially planar member of substantially equal width as said right member of said middle bed frame and non-rotatively connected along its lower edge to said right member of said middle bed frame such that said right side rail is substantially perpendicular to said middle bed frame;

e. a left forward side rail comprising a substantially planar member of substantially equal width as said left member of said forward bed frame and rotatively connected along its rear edge to the forward edge of said left side rail;

f. a left rear side rail comprising a substantially planar member of substantially equal width as said left member of said rear bed frame and rotatively connected along its forward edge to the forward edge of said left side rail;

g. a right forward side rail comprising a substantially planar member of substantially equal width as said right member of said forward bed frame and rotatively connected along its rear edge to the forward edge of said right side rail;

h. a right rear side rail comprising a substantially planar member of substantially equal width as said right member of said rear bed frame and rotatively connected along its forward edge to the forward edge of said right side rail.

3. The folding cart of claim 1, wherein said dual wheel assembly further comprises a horizontal U-shaped wheel assembly mounting bracket having a left end and a right end, with said wheel assembly mounting bracket attached to said rear side of said lower end of said lower frame, with the open side of the U facing away from said lower frame, and wherein said means for folding said wheels from a position substantially coplanar with said lower frame to a position perpendicular to the plane of said lower frame further comprises:

a. a U-shaped left wheel bracket having a curvate end, with said curvate end rotatably attached to said left end of said wheel assembly mounting bracket by means of a pivot pin, wherein the open end of the U is oriented toward the centerline of said folding hand truck and wherein said left wheel is rotatably connected to the closed end of the U, and wherein said left wheel bracket further comprises a folded position hole and an operative position hole in a side of the U;

b. a U-shaped right wheel bracket having a curvate end, with said curvate end rotatably attached to said right end of said wheel assembly mounting bracket by means of a pivot pin, wherein the open end of the U is oriented toward the centerline of said folding hand truck and wherein said right wheel is rotatably connected to the closed end of the U, and wherein said right wheel bracket further comprises a folded position hole and an operative position hole in a side of the U;

c. a left wheel bracket locking pin which passes through a side of said wheel assembly mounting bracket and can pass through either said folded position hole of said left wheel bracket or said operative position hole of said left wheel bracket; and d. a right wheel bracket locking pin which passes through a side of said wheel assembly mounting bracket and can pass through either said folded position hole of said right wheel bracket or said operative position hole of said right wheel bracket.

4. The folding cart of claim 2, wherein said dual wheel assembly further comprises a horizontal U-shaped wheel assembly mounting bracket having a left end and a right end, with said wheel assembly mounting bracket attached to said rear side of said lower end of said lower frame, with the open side of the U facing away from said lower frame, and wherein said means for folding said wheels from a position substantially coplanar with said lower frame to a position perpendicular to the plane of said lower frame further comprises:

a. a U-shaped left wheel bracket having a curvate end, with said curvate end rotatably attached to said left end of said wheel assembly mounting bracket by means of a pivot pin, wherein the open end of the U is oriented toward the centerline of said folding hand truck and wherein said left wheel is rotatably connected to the closed end of the U, and wherein said left wheel bracket further comprises a folded position hole and an operative position hole in a side of the U;

b. a U-shaped right wheel bracket having a curvate end, with said curvate end rotatably attached to said right end of said wheel assembly mounting bracket by means of a pivot pin, wherein the open end of the U is oriented toward the centerline of said folding hand truck and wherein said right wheel is rotatably connected to the closed end of the U, and wherein said right wheel bracket further comprises a folded position hole and an operative position hole in a side of the U;

c. a left wheel bracket locking pin which passes through a side of said wheel assembly mounting bracket and can pass through either said folded position hole of said left wheel bracket or said operative position hole of said left wheel bracket; and d. a right wheel bracket locking pin which passes through a side of said wheel assembly mounting bracket and can pass through either said folded position hole of said right wheel bracket or said operative position hole of said right wheel bracket.

* * * * *